United States Patent [19]
Prölss

[11] 4,193,955
[45] Mar. 18, 1980

[54] METHOD OF PRODUCING AN ELECTRICALLY CONDUCTIVE PLASTICS MATERIAL

[75] Inventor: Ludwig Prölss, Bellach, Switzerland

[73] Assignee: Kilcher-Chemie AG, Recherswil, Switzerland

[21] Appl. No.: 851,177

[22] Filed: Nov. 14, 1977

[30] Foreign Application Priority Data

Dec. 3, 1976 [CH] Switzerland ............. 15245/76

[51] Int. Cl.² ............................................. B29B 31/80
[52] U.S. Cl. ........................................ 264/23; 264/69; 264/105; 264/128
[58] Field of Search ............... 264/23, 69, 105, 128; 252/511

[56] References Cited

U.S. PATENT DOCUMENTS

| | | | |
|---|---|---|---|
| Re. 28,336 | 2/1975 | Dalton | 252/511 |
| 2,637,535 | 5/1953 | Arnold . | |
| 3,166,615 | 1/1965 | Farrell | 264/23 |

FOREIGN PATENT DOCUMENTS 1570329 6/1969 France .
1095776 12/1967 United Kingdom .
1404575 9/1975 United Kingdom .

*Primary Examiner*—Thomas P. Pavelko
*Attorney, Agent, or Firm*—Wender, Murase & White

[57] ABSTRACT

A method of producing an electrically conductive plastic material, the conductive pigment in said material being selected from lamp black, graphite and a mixture of lamp black and graphite wherein the conductive pigment is dispersed in a hydrocarbon solvent, the pigment-hydrocarbon dispersion then being subjected to a vibrational force to cause swelling of the conductive pigment in the solvent and adding a bonding agent having an interface surface tension substantially equal to that of the solvent.

8 Claims, 2 Drawing Figures

METHOD OF PRODUCING AN ELECTRICALLY CONDUCTIVE PLASTICS MATERIAL

BACKGROUND OF THE INVENTION

The present invention relates to a method of producing an electrically conductive plastic material in which soot (lamp black) or graphite is used as the so-called conductive pigment.

Pure plastic materials are generally electrically non-conductive. When one talks of a material being conductive, it is generally assumed that the material has a passage resistance of less than $10^4$ ohm.cm. Plastic materials are generally made electrically conductive by the incorporation therein of so-called conducting pigments such as specific metallic powders, graphite powder, highly structured lamp black and carbon fibers in a thermoplastic material. More recently, it has been proposed to utilise metallic "whiskers" to increase conductivity.

In general, the conductivity of the material is improved by increasing the proportion of the conducting pigment(s) in the plastic material, a greater proportion of conducting pigments being utilised if it is required to produce a higher degree of conductivity. However, if the proportion of conducting pigments exceeds a certain limit, the plastic material and conducting pigment mixture becomes brittle, and cannot be processed.

It is also known that to obtain a high conductivity, the main criterion is not so much the absolute proportion of conducting pigment in the mixture but rather the capacity of the conducting particles to link or be linked, together to form a cohesive structure, a so-called quasi-metal skeleton, which permits the passage of an electrical current. In such a case, it is important that the cohesive particle structure is not penetrated by the plastic material itself thereby insulating the current-carrying particles from one another.

In most known methods of manufacturing electrically conductive plastic materials, the conducting pigments are worked into the plastic material in a dry state. In order to disperse the particles in the viscous plastic material, high shearing forces must be supplied to the plastic material. The conductivity obtained is dependent, to a high degree, upon the time taken for such mixing because a short mixing time often leads to insufficient dispersion of the conducting pigments in the plastic material whilst long periods of homegenisation leads to the disintegration of the structure.

DETAILED DESCRIPTION OF THE INVENTION

Figure 1:
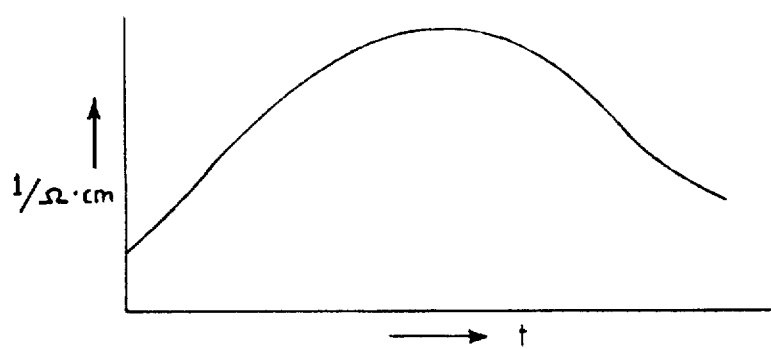
FIG. 1 is a graph in which the conductivity of a plastic material is plotted against mixing time.
Figure 2:
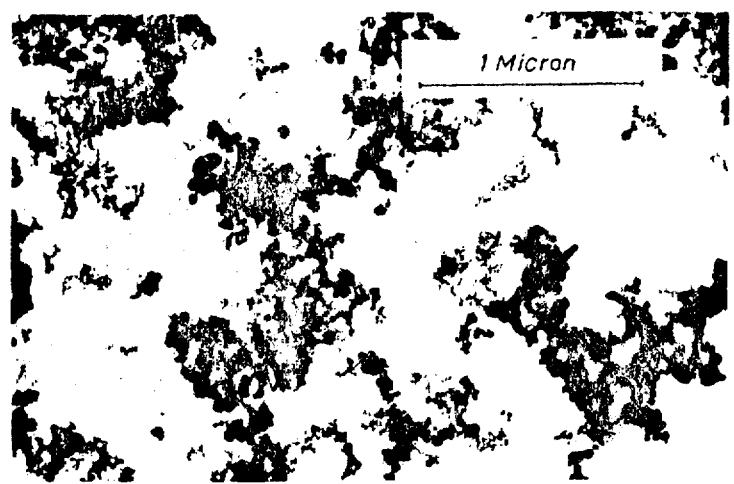
FIG. 2 is a photomicrograph of a plastic material having the conductivity versus time characteristics of FIG. 1 in which mixing was continued after the maximum conductivity had been attained.

As can be seen from FIG. 1, the conductivity of a plastic material initially increases with increasing mixing time, reaches a maximum and then decreases. Initially, after a short mixing period, agglomerates of the conductive pigments form which, if the pigment is lamp black, are called lamp black nests. Further mixing causes a more or less cohesive structure to be formed but still further causes the cohesive structure to break down and re-form the primary particles. These primary particles of conductive pigment are isolated from one another by the plastic material, thereby reducing the conductivity of the mixture. This effect can be clearly seen in FIG. 2, in which the black areas are the conductive pigments and the white areas are the plastic material.

The present invention seeks to provide a process which permits the production of a plastic material having a high electrical conductivity which does not substantially alter the mechanical properties of the plastic material.

According to the present invention there is provided a method of producing an electrically conductive plastic material, the conductive pigment in said material being selected from lamp black, graphite and a mixture of lamp black and graphite wherein the conductive pigment is dispersed in a hydrocarbon solvent, the pigment-hydrocarbon dispersion then being subjected to a vibrational force to cause swelling of the conductive pigment in the solvent and adding a bonding agent having an interface surface tension substantially equal to that of the solvent.

A common feature in known processes is the addition of the conductive pigments to a viscous plastic material. This means that the pigment, such as lamp black has to be crushed by the high shearing forces. However, by using the method of the present invention, the pigment which is usually lamp black, graphite or a mixture of lamp black and graphite, is first broken up to a maximum extent and only thereafter is plastic material incorporated therewith in such a manner that the conductive paths are not broken. The dispersion of the pigment is therefore carried out in a low viscosity solvent.

The splitting of the lamp black or graphite agglomerate into a skeletal structure is decisively affected by the chemical nature of the solvent, the wetting and absorption properties of the solvent determining whether the lamp black or graphite swells therein, or not. It has been found that aromatic hydrocarbons, straight-chain, branched-chain or cycloaliphatic hydrocarbons are particularly suitable as solvents. On the other hand, lamp black or graphite does not swell in chlorinated hydrocarbons and a plastic material produced utilising such a solvent has a low conductivity.

Even in suitable solvents, however, lamp black or graphite only swells to a limited extent. To obtain further swelling and splitting of the agglomerate, it is necessary to supply energy to the solution. This energy could be supplied partially in the form of heat, but heat alone does not provide the desired improvement in conductivity in the finished product.

It is also possible to use conventional high shearing forces using, for example, a ball mill, but the forces produced only convert the lamp black or graphite paste into a slurry comprised of partial skeletal structures and primary particles.

It has now been found that the most suitable form in which to supply the energy is in the form of cavitation oscillations as may occur, for example, in the boundary vortex of dissolver discs, and sonic or ultrasonic vibrations. Tests have shown that vibrational energy having a frequency of 3000 to 5000 Hz give good results. This would appear to indicate that the natural frequency of the aggregate in the solvent lies in this range. Resonance frequencies are set up and the aggregate disintegrates into skeletal structures. This effect can be observed visually due to the considerable volumetric swelling of the lamp black or graphite.

After the lamp black or graphite has swollen to its maximum extent, the plastic material is added thereto in the form of a solution or as a solid. In either case, it has to be ensured that it is added slowly and carefully so as to prevent so-called bonding agent shock. When selecting the bonding agent, that is to say, the plastic material which surrounds the conductive material, it must be ensured that it has a similar interfacial tension or structure as the solvent to be displaced. Thus, for example, it is advantageous when using styrene as solvent to utilise polystyrene as the bonding agent.

It is possible to use polystyrene, polyisobutylene, butyl rubber, silicon rubber, natural rubber, ethylenephenyl acetate, an ethylene-propylene mixed polymer, an ethylene-propylene terpolymer, butadiene-styrene rubber, a styrene-butadiene-styrene block polymer, a styrene-isoprene-styrene block polymer, a styrene-ethylene-butylene-styrene block polymer, and possibly polyethylene as the bonding agent.

During the final stage of the process, which is drying of the lamp black bonding agent mixture, the solvent is continuously displaced at the boundary layer of the lamp black by the bonding agent without structural changes occurring. However, the structure, due to shrinkage of between 300% and 1000% which occurs during drying, becomes compressed and conductive. In other words, the volume of the mixture is reduced, depending upon the solids content thereof to between one-third and one-tenth of its original volume.

In a sheet produced in accordance with the process of the present invention, it was found that the surface resistance was of an order of magnitude of a hundred times lower than the surface resistance measured at right angles thereto. When using lamp black along, a surface conductance of approximately 1/0.05 ohm cm. was obtained, a value which corresponds substantially to that of pure lamp black compacted at high pressure, which has a value of about 1/0.03 ohm cm.

It has been found that by combining lamp black with graphite, even better conductance values can be attained than those attainable with the two components individually, this being due to the fact that the graphite particles have fewer layer-lattice deformations than the primary particles of the lamp black.

The electrically conductive material thus produced may be provided in sheet form or in the form of strips or webs and, for example, may be used for resistance heaters or for grounding static charges. The material may, however, also be produced in liquid form or in liquefiable form which may be used for coating by spraying. It is, moreover, also possible, utilising the process of the present invention, to produce plastic material objects which have a good electrical conductance, but which do not contain any metal. This opens up a wide field of application for such products.

What we claim is:

1. A method of producing an electrically conductive plastic material, the conductive pigment in said material being selected from lamp black, graphite and a mixture of lamp black and graphite, comprising the steps of dispersing the conductive pigment in a hydrocarbon solvent, subjecting the pigment-hydrocarbon dispersion to a vibrational force with a frequency corresponding approximately to the frequency of resonance of the pigment-structure to cause swelling of the conductive pigment until the maximum of the volume is reached, and, at the time of maximum swelling, adding a bonding agent having an interfacial tension substantially equal to that of the solvent.

2. A method as claimed in claim 1 wherein the solvent is selected from an aromatic hydrocarbon and mixtures of aromatic hydrocarbons.

3. A method as claimed in claim 1, wherein the solvent is selected from straight-chain, branched-chain and cycloaliphatic hydrocarbons and mixtures of said aliphatic hydrocarbons.

4. A method as claimed in claim 1, wherein the solvent comprises a mixture of at least one aromatic hydrocarbon with at least one aliphatic hydrocarbon selected from straight-chain, branched-chain and cycloaliphatic hydrocarbons.

5. A method as claimed in claim 1, wherein the dispersion is subjected to vibrational energy in the form of cavitation oscillations.

6. A method as claimed in claim 1, wherein the vibrational force is in the form of sonic vibrations.

7. A method as claimed in claim 1, wherein the vibrational force is in the form of ultrasonic vibrations.

8. A method as claimed in claim 1, wherein the vibrational force has a frequency in excess of 3000 Hz.

* * * * *